United States Patent [19]

Ijuin et al.

[11] Patent Number: 4,975,787
[45] Date of Patent: Dec. 4, 1990

[54] SHEET CONVEYING AND READING APPARATUS

[75] Inventors: Kazuya Ijuin, Tokyo; Shinnichiro Otsuki, Yokohama; Yuji Nakano, Yokosuka; Hiroshi Ogushi, Tokyo, all of Japan

[73] Assignee: Canon Kabushiki Kaisha, Tokyo, Japan

[21] Appl. No.: 211,569

[22] Filed: Jun. 28, 1988

[30] Foreign Application Priority Data

Jul. 6, 1987 [JP] Japan .............................. 62-167055
Jul. 6, 1987 [JP] Japan .............................. 62-167058

[51] Int. Cl.⁵ .............................................. H04N 1/40
[52] U.S. Cl. .................................. 358/461; 353/464; 353/496; 353/493
[58] Field of Search ............... 358/294, 293, 285, 461, 358/464, 496, 498; 271/251, 165, 273

[56] References Cited

U.S. PATENT DOCUMENTS 4,743,976  5/1988  Katakabe et al. .................. 358/293

FOREIGN PATENT DOCUMENTS

0127463  7/1983  Japan .................................. 358/294

Primary Examiner—Edward L. Coles, Sr.
Attorney, Agent, or Firm—Fitzpatrick, Cella, Harper & Scinto

[57] ABSTRACT

An image reading apparatus has conveying means for conveying a sheet, a transparent member for intimately contacting the sheet conveyed by the conveying means, a photoelectric conversion element provided on or in proximity to the transparent member for reading an image formed on the sheet conveyed by the conveying means, support means for supporting the conveying means, and positioning means provided on the support means for positioning the photoelectric conversion element relative to the conveying means.

24 Claims, 3 Drawing Sheets

SHEET CONVEYING AND READING APPARATUS

BACKGROUND OF THE INVENTION

1. Field of the Invention

This invention relates to an apparatus for conveying a sheet such as an original and at the same time, reading images such as characters formed on the sheet. The apparatus of this type is often used, for example, in a facsimile apparatus or the like.

2. Related Background Art

An apparatus of this type has been disclosed, for example, in U.S. Pat. No. 4,438,918. In this apparatus, a sheet (an original) is conveyed along a predetermined conveyance path by conveying rollers. A slit is provided in the course of the conveyance path, and a light is applied to the original through the slit and the reflected light therefrom is imaged on an image sensor by a lens to thereby read the image of the original. The image sensor comprises a photoelectric conversion element disposed on a base plate widthwisely of the original, and the reflected light from the original is received and converted into an electrical signal by the photoelectric conversion element.

In such an apparatus, however, the image sensor can be disposed at a location within the apparatus into which it is difficult for the outside light to enter but a lens, a reflecting mirror, etc. are required, and this leads to bulkiness in the apparatus.

Therefore, the applicants have developed a reading apparatus for reading the image of an original directly by an image sensor without the use of a lens, a reflecting mirror, etc. In this reading apparatus, a photoelectric conversion element is provided on a transparent plate disposed on a base plate having a hole for passing therethrough the light beam from a light source, and the photoelectric conversion element is covered with a protective transparent sheet. When the original is to be read, the reflected light of said light beam applied to the original being conveyed while contacting said protective transparent sheet is received and converted into an electrical signal by the photoelectric conversion element.

However, where the original is directly read in this manner by the photoelectric conversion element without the intermediary of a lens, the resolving power drops and the image becomes blurred if the original floats from the protective transparent sheet. To keep a high resolving power, it is necessary to use a conveying roller for conveying the original while urging the original against the protective transparent sheet and moreover to, make an array of photoelectric conversion elements (a reading line) arranged so as to cross the conveyance path coincident with the base plate of the conveying roller with high accuracy.

However, with a construction in which an image sensor is held on a base plate pivotably supported on a shaft parallel to the shaft of the conveying roller and the base plate is urged against the conveying roller, it is difficult to obtain high accuracy. That is, both the shaft of the conveying roller and the shaft of the base plate support the opposite ends and it is difficult to form a supporting hole in a support member at an accurate location. It is also conceivable to support the shaft of the base plate in a slot in order that the protective transparent sheet may be uniformly urged against the conveying roller, but again in that case, it is difficult to make the base line of the conveying roller coincident with the reading line.

SUMMARY OF THE INVENTION

It is an object of the present invention to solve the above-noted problems and to provide a sheet conveying and reading apparatus in which even if the manufacturing and mounting accuracies of a conveying roller and a base plate are not so strictly controlled, the axis of the conveying roller, i.e., the line of contact (base line) of the roller with an image sensor can be automatically made coincident with the array of photoelectric conversion elements (the reading line) of the image sensor.

To achieve the above object, the present invention provides an apparatus having conveying means for conveying a sheet along a set path, and image sensor means having its light-receiving surface located on said set path and contacting one surface of the sheet being conveyed, the image sensor means has a photoelectric conversion element extending on a base plate widthwisely of said sheet and is resiliently urged into contact with a conveying roller (which is the conveying means in said photoelectric conversion element portion) by resilient urging means. A support member is provided for rotatably supporting said conveying roller and has a fiducial end surface parallel to the axis of said conveying roller, and the front end surface of said base plate is resiliently urged into contact with the fiducial end surface of said support member.

DESCRIPTION OF THE PREFERRED EMBODIMENT

An embodiments of the present invention will hereinafter be described with reference to the drawings.

Figure 1:
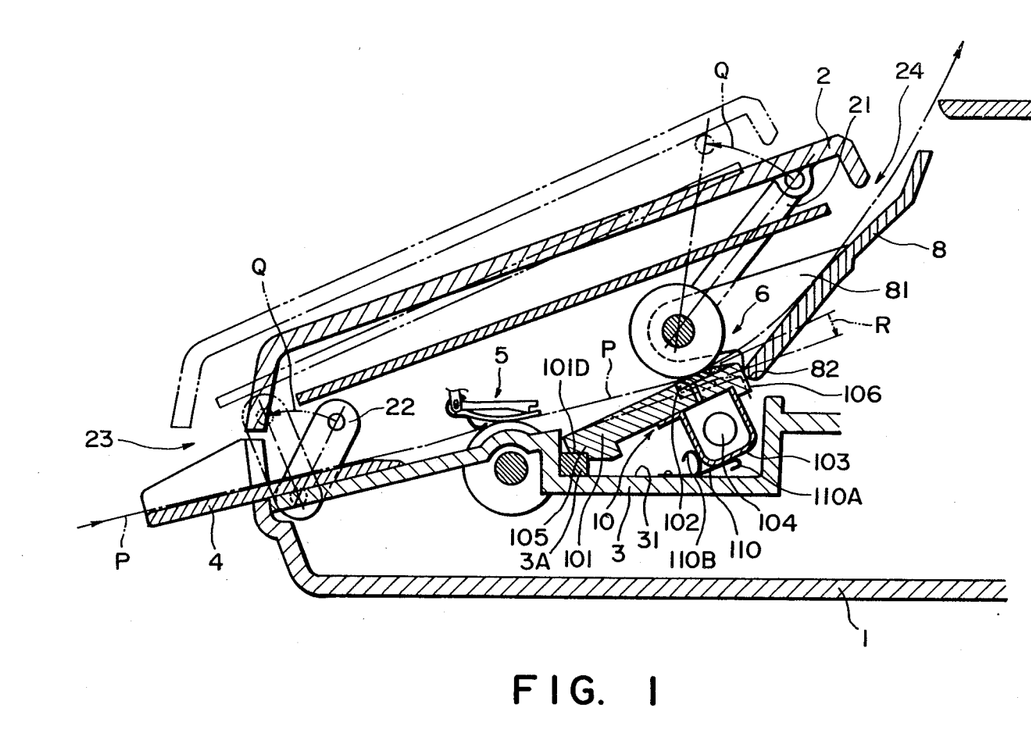
FIG. 1 is a longitudinal cross-sectional view schematically showing the construction of an apparatus according to an embodiment of the present invention.

FIG. 1 is a cross-sectional view schematically showing the construction of a facsimile apparatus as an apparatus according to an embodiment of the present invention.

Referring to FIG. 1, a support base plate 3 is provided at an intermediate location in a frame member 1, and various means for defining a predetermined conveyance path P for a sheet such as an original (not shown) are provided thereon. That is, a planar original receiving plate 4 is provided at the entrance side in the direction of conveyance of the original, and front-stage conveyor means 5, rear-stage conveyor means 6, image sensor means 10, and an original carrying-out guide plate 8 are successively provided in the direction of conveyance, whereby the conveyance path P is formed. A lid member 2 is provided so as to be openable and closable within a predetermined range in such a manner as to cover the various means provided along the conveyance path P.

Figure 2:
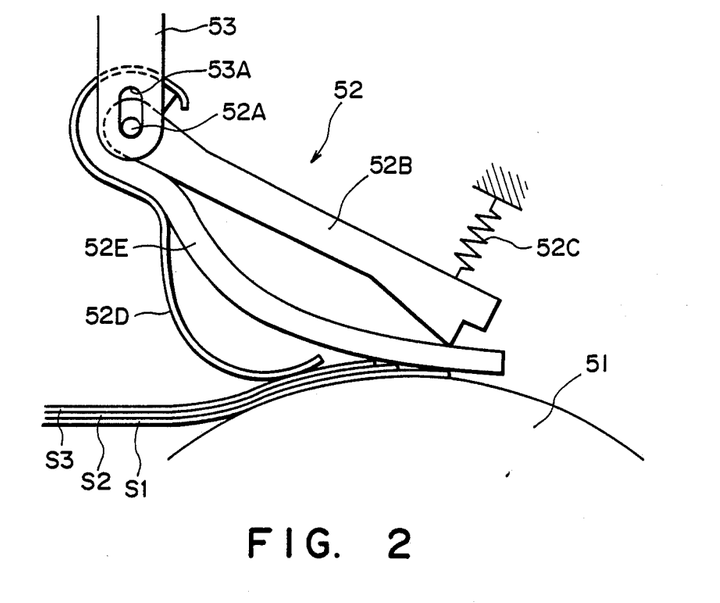
FIG. 2 is an enlarged view of the front-stage conveying means of the FIG. 1 apparatus.

The front-stage conveyor means 5 disposed at a downstream position on the original receiving plate 4 with respect to the direction of conveyance comprises a front-stage roller 51 for conveyance located under the conveyance path P and having its outer periphery in contact therewith, as shown in detail in FIG. 2, and a contact member 52 which is in contact with the front-stage roller 51 from above the latter. The contact member 52 has a support member 52B (supported at one end for pivotal movement about a pin 52A which provides a fulcrum) and is downwardly urged near the other end by a spring 52C: contact member 52 also includes a first member 52D of a spring material held at said one end in a cantilever fashion by the support member 52B, and a second member 52E such as a rubber plate.

When the original is not being conveyed, the first member 52D and the second member 52E are resiliently urged into contact with each other at a position which is proximate to or in contact with the front stage roller 51. The state of contact is such that a substantially wedge-shape space is formed at the entrance side for the original so as to readily receive the leading end of the original thereinto. The relation between the coefficients of friction of the two members is set so that the frictional force with the roller 51 is greater in the second member 52E than in the first member 52D. Such a contact member 52 is supported by the pin 52A so as to be vertically movable within a predetermined range in a slot 53A formed in a fixed support member 53.

Figure 3:
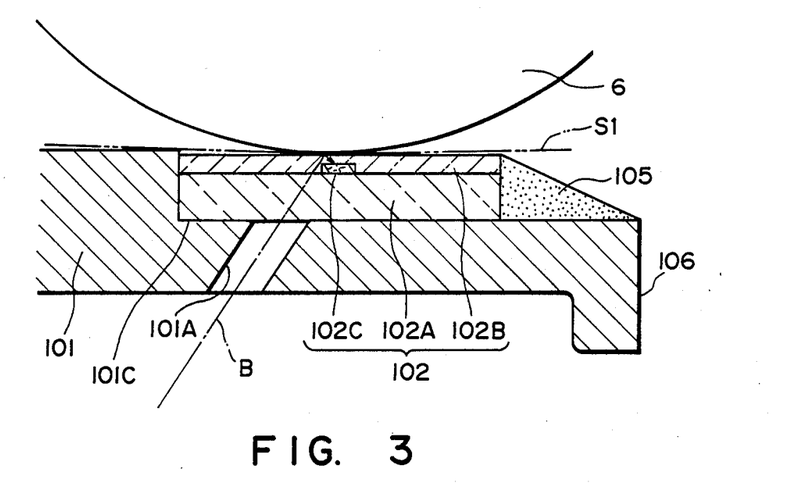
FIG. 3 is an enlarged cross-sectional view of the vicinity of the photoelectric conversion element of the image sensor means of the FIG. 1 apparatus.

Turning back to FIG. 1, the image sensor means 10 is disposed in a recess 31 formed in the intermediate portion of the support base plate 3, and a rear-stage roller 6 as rear-stage conveyor means is in contact with the image sensor means 10. The image sensor means 10 is provided with a light-receiving portion 102 including a photoelectric conversion element in a stepped portion (recess) formed in the upper surface of a base plate 101, as shown in FIG. 3.

A cover 103 is attached to the underside of the base plate 101, and a xenon tube 104 as a light source is disposed in the cover 103 (see FIG. 1). The base plate 101 is provided with an engagement portion 101D engaged with a corner of a support block 3A provided on the support base plate 3. The support base plate 3 is supported for some movement by the support block 3A. Also, the base plate 101 has a fiducial end surface 106 accurately dimensioned in a direction perpendicular to the plane of the drawing sheet, i.e., in the widthwise direction of the original. On the other hand, the carrying-out guide plate 8 fixedly provided relative to the support base plate 3 has an arm 81 for rotatably supporting the opposite ends of the rear-stage roller 6 by the opposite ends thereof in a direction perpendicular to the plane of the drawing sheet.

Further, a fiducial end surface 82 extending in a direction perpendicular to the plane of the drawing sheet and parallel to the axis of the rear-stage roller 6 is formed on the lower portion of the carrying-out guide plate 8 and is adapted to bear against the fiducial and surface 106 of the base plate 101. The cover 103 attached to the base plate 101 is urged upwardly and rightwardly by a spring 110 having one end fixed to the support base plate 3 and the other end (or the free end) opened substantially into a V-shape. That is, the spring 110 has its free end formed into a comb-tooth-like shape so as to form a V-shape by the comb teeth being alternately bent, and each of the comb teeth is substantially independently resiliently deformable.

A first portion 110A of the spring 110 which is opened into a V-shape bears against the bottom of the cover 103 and urges the base plate 110 against the roller 6. A second portion 110B of the spring 110 abuts a side surface of the cover to thereby urge the fiducial end surface 106 of the base plate 110 against the fiducial end surface 82.

The light-receiving portion 102 provided on the stepped portion of the base plate 101 comprises a photoelectric conversion element 102C disposed on a transparent plate 102A such as a glass plate and a protective transparent sheet 102B such as a glass sheet provided thereon. The photoelectric conversion element 102C is located at the portion of contact with the rear-stage roller 6, and is positioned parallel to the fiducial end surface 106 of the base plate 101. Further, the right end surfaces (the forward end surfaces as viewed in the direction of conveyance) of the transparent plate 102A and the protective transparent sheet 102B are covered with a triangular light-intercepting member 105 thinning in the rightward direction. The light-intercepting member 105 is not limited in its material, but may be provided by simple application of a coating material to said end surfaces, adhesion of a tape or the like to said end surfaces, or partial rising of the base plate 101, and the shape thereof may be various if it is such as to increase the space between it and the conveyance path P in the direction of conveyance.

Next, as shown in FIG. 1, the lid member 2 is adapted to be capable of being opened as a two-lever crank mechanism in the direction of arrow in FIG. 1 by levers 21 and 22 pivotable in two forward and rearward positions in the direction of conveyance between it and the support base plate 3. In the case of the present embodiment, the right lever 21 is longer than the left lever 22 and therefore, the lid member 2 may be opened more widely on the right side.

Here, one of the pin couplings between the lid member 2 and the two levers 21, 22 is adapted to be capable of being released in a set opening position as required. For example, one of the pins can be removed in said opening position, whereby the lid member 2 can be opened upwardly widely in the fashion of a door by the other lever. Further, in a part of said two-lever crank mechanism, a cam (not shown) may be provided, for example, at the lower fulcrum of the lever 21, and during the opening operation of said crank mechanism, the base plate 101 of the image sensor means 7 may be downwardly urged by the cam against the force of the spring 110 so that a predetermined gap can be provided between the base plate 101 and the rear-stage roller 6.

Although not shown, other members such as a recording unit, etc. necessary to the facsimile apparatus are contained in the space at the right of the support base plate 3.

Operation of the apparatus of the present embodiment constructed as described above will now be described.

A plurality of originals are first inserted from the left-hand side of FIG. 1 along the original receiving plate 4. The originals are inserted until they are held between the front-stage roller 51 and the first member 52D. At this time, the originals are smoothly held between the front-stage roller 51 and the first member 52D because the first member 52D is formed of a material of low coefficient of friction and the front-stage roller 51 is of a shape which forms a wedge-shaped space between it and the first member 52D. The originals are thus held between the front-stage roller 51 and the first member 52D and therefore, even if the original receiving plate 4 forms an upward slope as shown, the originals will not fall.

Also, the first member 52D and the second member 52E are supported for vertical movement within a predetermined range in the slot 53A of the fixed support member 53 by the pin 52A and therefore, even if a number of originals are inserted at a time, the frictional forces of the first and second members with the roller are prevented from becoming excessively great by the fulcrum of the contact member 52 being retracted and therefore, it will never happen that two or more originals are fed out at a time, and this contributes to the avoidance of trouble.

When the front-stage roller 51 is rotated, a conveyance force is imparted to the lowermost original S1 of the originals S1, S2 and S3, and then the originals S2 and S3 thereon are also fed out by the frictional force between the originals. Each original is conveyed until the leading end thereof bears against the second member 52E. Since the second member 52E and the front-stage roller 51 form a wedge-shaped space therebetween, the originals S1–S3 inserted with their leading end made uniform are held therebetween with their leading end edges deviated from one another in succession as shown in FIG. 2, and the originals are reliably conveyed one by one in the order of S1, S2 and S3 by the frictional force with the front-stage roller 51. At that time, the frictional force with the front-stage roller 51 is greater on the second member 52E than on the first member 52D and therefore, while the first member holds down the second and subsequent originals S2 and S3, only the first original S1 is reliably conveyed as a result.

The original S1 thus singly fed on the conveyance path P then passes over the image sensor means 10 with the aid of the rear-stage roller 6. The light beam B emitted from the light source 104 passes through a hole 101A in the base plate 101 as shown in FIG. 3, is applied to the original S1 and is reflected by the original, and is converted into an electrical signal by the photoelectric conversion element 102C, and this signal is read.

At that time, the fiducial end surface 106 of the base plate of image sensor means bears against the fiducial end surface 82 of the carrying-out guide plate 8 supporting the rear-stage roller 6, by the force of the spring 110, and therefore, the degree of parallelism of the rear-stage roller 6 and the photoelectric conversion element in a direction perpendicular to the plane of the drawing sheet and the positional relation therebetween which have been initially set with high accuracy are not destroyed but remain stable. Further, the spring 110 forms a plurality of substantially independent resiliently urging portions arranged in a direction perpendicular to the plane of the drawing sheet and therefore, even if there is some manufacturing error in the contact pressure of the rear stage roller 6 with respect to the photoelectric conversion element, such error will be sufficiently compensated for and a uniform contact state will be maintained in said direction. Thus, the reading by the photoelectric conversion element is accomplished with good accuracy and with stable sensitivity.

In other words, the base plate 101 engages with the support block 3A only at the engaged portion 101D thereof, and is movable in the sheet convey direction and rockable toward the rear-stage roller 6. Accordingly, the protective transparent plate 102B of the sensor 10 is evenly abutted against the rear stage roller 6 by the biasing force of the first portion 110A of the spring 110. The fiducial end surface 106 of the base plate 110 is abutted against the fiducial end surface 82 of the conveying-out guide plate 8 by the biasing force of the second portion 110B of the spring 110. Furthermore, the rear-stage roller 6 is supported by the conveying-out guide plate 8. For this reason, it is rather easy to make an axis of the rear-stage roller 6 and the fiducial end surface 82 parallel with high accuracy. It is also rather easy to make the fiducial end surface 106 of the base plate 110 and a line of the photoelectric conversion element 102C (the reading line in the FIG. 4) parallel with high accuracy. Thus, the base line of the rear-stage roller 6 and the line of the photoelectric conversion element are coincident or aligned accurately.

Also, light enters through an original insertion port 23 formed between the lid member 2 and the original receiving plate 4 and an original discharge port 24 formed between the lid member 2 and the original carrying-out guide plate 8. However, the upstream side end portions of the transparent plate 102A and the protective transparent plate 102B are shielded from light by the base plate 101, and the downstream side end portions thereof are shielded from light by the light-intercepting member 105. Accordingly, the early deterioration of the photoelectric conversion element by outside light is prevented. Also, the production of noise during the reading of the original can be prevented and stable reading of the original can be accomplished.

Thus, as the reading of the original progresses, the original S1 is carried out of the apparatus while being guided on the carrying-out guide plate 8. At that time, the dust, paper powder, etc. adhering to the original may collect near the photoelectric conversion element 102C to adversely affect the reading accuracy.

In the present embodiment, however, the light-intercepting member 105 is inclined in the direction of conveyance and forms a gradually widening space between it and the conveyance path P and thus, as the original is conveyed, the aforementioned dust, paper powder, etc. are removed from the image sensor means 10 and do not collect near at least the photoelectric conversion element 102C, and predetermined reading accuracy is maintained. That is, even if dust, paper powder, etc. adhere to the surface of the protective transparent sheet 102B, they are wiped off by the sheet S1 being conveyed to the downstream side end portion of the protective transparent sheet 102B, and fall down the inclined surface of the light intercepting member 105.

A description now be given of a counter measure for so called jamming during the conveyance of the original.

In the prior-art apparatus, the jam has been coped with by pivoting the lid member greatly about one end thereof to open it in the fashion of a door. In this case, one end of the lid member is widely opened but the vicinity of the center of pivotal movement is not much opened and therefore, when a jam has occurred near the center of pivotal movement, it has been impossible to provide a sufficient gap for drawing the original therethrough.

In the apparatus of the present embodiment, the lid member 2 is opened with a predetermined spacing over the whole range in the direction of arrow Q by a two-lever crank mechanism having the levers 21 and 22 and therefore, even if a jam occurs anywhere in the apparatus, the original can be easily drawn out. Moreover, with the pivotal movement of said levers, image sensor means 10 is downwardly urged by a cam (not shown) and is rotated in the direction of arrow R to thereby provide a sufficient gap between it and the rear-stage roller 6 and therefore, jam can be easily coped with. In that case, if the right lever 21 is longer than the left lever 22, the degree of opening of the right lever will become greater, and this is convenient. Further, in the present embodiment, the link coupling between one lever and the lid member 2 can be released in a predetermined open position as required and therefore, at that point of time, the lid member can be opened in the fashion of a door like the conventional lid member, whereby any trouble other than a jam can be coped with.

In the above-described embodiment, the front-stage roller 51 is disposed below the sheet, but alternatively, it may be disposed above the sheet and the first member 52D and the second member 52E may be disposed below the sheet.

Also, the front-stage roller 51 may be replaced by a conveyor belt. Where a conveyor belt is employed, the first and second members should be constructed in such a shape that a space spreading toward the upstream side is formed between the conveyor belt and the first member and between the conveyor belt and the second member.

Figure 4:
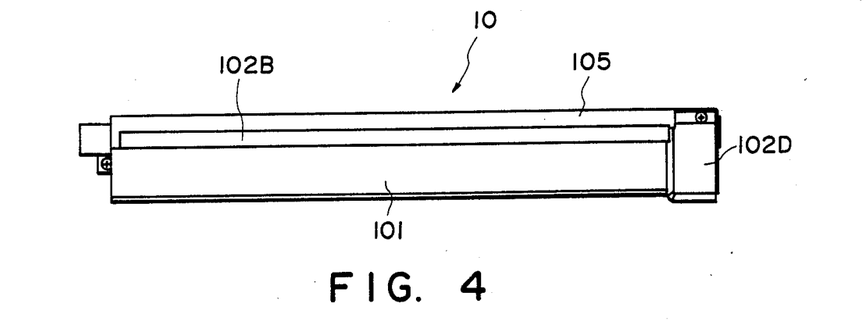
FIG. 4 is a plan view of the image sensor means.

FIG. 4 is a plan view of the image sensor means 10. In FIG. 4, the reference character 102D designates a case in which is contained a driving circuit for the image sensor means. The light-intercepting member 105 may be provided not only in the downstream side end portion, but may be provided also in the side edge portion, as required.

Figure 5:
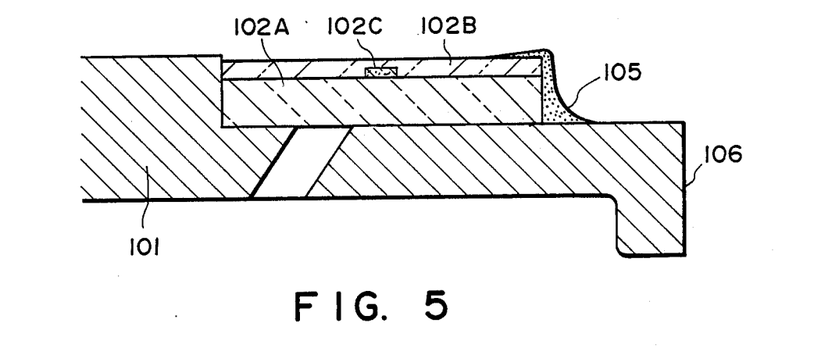
FIG. 5 is an enlarged cross-sectional view of the image sensor means.

FIG. 5 shows an example which uses an epoxy adhesive agent as the light-intercepting member of the image sensor means. An opaque (black) epoxy adhesive agent is applied to the end portions of the transparent plate 102A and the protective transparent sheet 102B and is solidified. In the example shown in FIG. 5, the epoxy adhesive agent is thinly applied also to a part of the surface of the protective transparent sheet 102B to thereby enhance the light-intercepting effect. In this case, if the epoxy adhesive agent is applied too thickly to the surface of the protective transparent sheet 102B, the leading end of the original being conveyed will be caught by it or dust, paper powder, etc. will collect on it. Consequently, the epoxy adhesive agent is applied as thinly as possible, and is preferably applied in a wedge shape so that no level difference is formed between it and the protective transparent sheet 102B.

Figure 6:
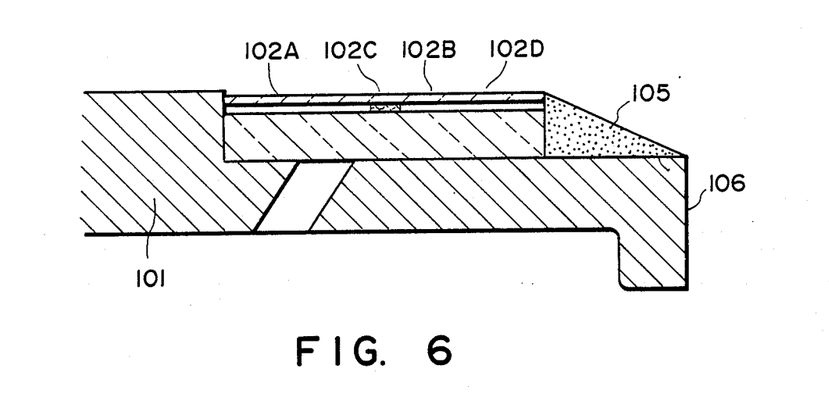
FIG. 6 shows another embodiment of the image sensor means.

FIG. 6 shows another embodiment of the image sensor means. In FIG. 6, the photoelectric conversion element 102C is placed on the transparent plate 102A, and further, the protective transparent plate 102B is secured to the transparent plate 102A by means of a transparent adhesive agent. Accordingly, a layer of transparent adhesive agent is provided between the transparent plate 102A and the protective transparent plate 102B.

The photoelectric conversion element 102C may be protected by a transparent layer so as not to be in direct contact with the original. For example, a transparent and fluid protective agent may be applied onto the photoelectric conversion element and solidified. Alternatively, the photoelectric conversion element may be embedded in a glass plate.

We claim:

1. An image reading apparatus comprising:
    conveying means for conveying sheets;
    a transparent member contacting the sheets conveyed by said conveying means;
    a photoelectric conversion element provided in proximity with said transparent member, for reading an image formed on the sheets conveyed by said conveying means;
    support means for supporting said conveying means;
    positioning means provided on said support means for positioning said photoelectric conversion element relative to said conveying means, said positioning means having a fiducial surface formed parallel to a rotary axis of said conveying means;
    a holding member for holding said transparent member and said photoelectric conversion element, said holding member including a second fiducial surface bearing against said fiducial surface; and
    resilient means for biasing said second fiducial surface in a direction against said fiducial surface.

2. An image reading apparatus according to claim 1, further having second resilient means for biasing said holding member in a direction toward said conveying roller.

3. An image reading apparatus having:
    a rotational member for conveying a sheet;
    a photoelectric conversion element for reading an image formed on the sheet conveyed by said rotational member;
    a light-transmitting protective member covering said photoelectric conversion element;
    a base plate, lateral movement and pivotal movement of which are permitted within a predetermined range for holding said photoelectric conversion element and said light-transmitting protective member;
    support means for supporting said rotational member;
    positioning means provided on said support means for positioning said base plate relative to said rotational member;
    first biasing means for biasing said base plate toward said positioning means;
    second biasing means for biasing said base plate so that said protective member is urged against said rotational member.

4. An image reading apparatus according to claim 3, wherein said first biasing means includes a spring member for imparting a biasing force to a plurality of regions of said base plate.

5. An image reading apparatus according to claim 4, wherein said second biasing means includes a second spring member for imparting a biasing force to a plurality of regions of said base plate.

6. An image reading apparatus according to claim 4, further having a transparent plate on the side opposite to that side of said protective member contacting said rotational member, and illuminating means for illuminating the surface of said sheet through said transparent plate.

7. An image reading apparatus according to claim 3, wherein said positioning means positions said base plate so that said photoelectric conversion element is positioned at a location corresponding to the base line of said rotational member.

8. An image reading apparatus according to claim 7, wherein said positioning means includes a fiducial surface for bearing against said base plate and positioning said base plate.

9. An image reading apparatus according to claim 3, wherein said protective member includes a transparent planar member.

10. An image reading apparatus according to claim 9, wherein said photoelectric conversion element is in contact with said planar member.

11. An image reading apparatus according to claim 9, wherein said photoelectric conversion element is embedded into said planar member.

12. A reading apparatus, including:
conveying means for conveying sheets;
guiding means for guiding the sheets to be in contact with said conveying means;
reading means for reading images formed on the sheets conveyed by said conveying means;
supporting means for supporting said conveying means;
holding means for holding said reading means;
a first reference surface formed on said supporting means:
a second reference surface formed on said holding means to contact with said first reference surfaces to thereby position said reading means to be opposed to said conveying means.

13. A reading apparatus according to claim 12, wherein said guiding means has a transparent member holding the sheet conveyed by said conveying means.

14. A reading apparatus according to claim 13, wherein said reading means has a photoelectric converting element disposed on or adjacent to said transparent member.

15. A reading apparatus according to claim 14, wherein said conveying means has a rotary member rotating while in contact with a sheet.

16. A reading apparatus according to claim 15, wherein a rotational axis of said rotary member is disposed parallel to said first reference surface.

17. A reading apparatus according to claim 16, wherein said photoelectric converting element is disposed parallel to said second reference surface.

18. A reading apparatus according to claim 17, wherein an axial line of said rotary member and a longitudinal line of said photoelectric converting element are disposed in a parallel state by said first reference surface and said second reference.

19. A reading apparatus according to claim 18, wherein said transparent member has a first surface for guiding the sheet, and a second surface formed at a side opposite to said first surface to contact said photoelectric converting element.

20. A reading apparatus according to claim 19, wherein said transparent member is held by said holding member.

21. A reading apparatus according to claim 20, wherein said photoelectric converting element is embedded in said transparent member.

22. A reading apparatus according to claim 20, further comprising another transparent member disposed opposing said converting element is held between said transparent member and said another transparent member.

23. A reading apparatus according to claim 20, further comprising a resilient member for biasing said holding member toward said first reference surface.

24. A reading apparatus according to claim 23, further comprising a second resilient member for biasing said holding means toward said rotary member.

* * * * *

UNITED STATES PATENT AND TRADEMARK OFFICE
CERTIFICATE OF CORRECTION

PATENT NO. : 4,975,787       Page 1 of 2

DATED : December 4, 1990

INVENTOR(S) : Kazuya IJUIN, et al.

It is certified that error appears in the above-identified patent and that said Letters Patent is hereby corrected as shown below:

COLUMN 1,

Line 53, "over to," should read --over, to--.

COLUMN 3,

Line 12, "spring 52C: contact" should read --spring 52C. Contact--.

COLUMN 5,

Line 1, "tho" should read --the--.

COLUMN 6,

Line 51, "description now" should read --description will now-- and, "counter measure" should read --countermeasure--.

UNITED STATES PATENT AND TRADEMARK OFFICE
CERTIFICATE OF CORRECTION

PATENT NO. : 4,975,787

DATED : December 4, 1990

INVENTOR(S) : Kazuya IJUIN, et al.

It is certified that error appears in the above-identified patent and that said Letters Patent is hereby corrected as shown below:

COLUMN 8:

Line 54, "claim 4," should read --claim 5,--.

COLUMN 9:

Line 22, "first reference surfaces" should read --first reference surface--.

COLUMN 10:

Line 11, "second reference." should read --second reference surface.--.

Line 25, "said converting" should read --said second reference surface, and wherein said photoelectric converting--.

Signed and Sealed this

Fifteenth Day of September, 1992

Attest:

DOUGLAS B. COMER

*Attesting Officer*     *Acting Commissioner of Patents and Trademarks*